United States Patent [19]

Nishibe

[11] Patent Number: 5,185,515

[45] Date of Patent: Feb. 9, 1993

[54] AUTOMATED TELLER MACHINE AND METHOD THEREOF

[75] Inventor: Kunihiko Nishibe, Tsuchiura, Japan

[73] Assignee: Hitachi, Ltd., Tokyo, Japan

[21] Appl. No.: 602,859

[22] Filed: Oct. 24, 1990

[30] Foreign Application Priority Data

Oct. 26, 1989 [JP] Japan .................................. 1-279486

[51] Int. Cl.⁵ .......................... G06K 15/30; G06K 5/00
[52] U.S. Cl. .................................... 235/379; 235/380; 235/382
[58] Field of Search ............... 235/375, 379, 380, 382; 434/112, 113, 117, 114; 340/712

[56] References Cited

U.S. PATENT DOCUMENTS

| 4,593,183 | 6/1986 | Fukatsu | 235/379 |
| 4,761,542 | 8/1988 | Kubo et al. | 235/379 |
| 4,972,496 | 11/1990 | Sklarew | 382/13 |

FOREIGN PATENT DOCUMENTS

| 55-13461 | 1/1980 | Japan . | |
| 60-10387 | 1/1985 | Japan | 235/379 |
| 61-893 | 1/1986 | Japan . | |
| 61-150065 | 7/1986 | Japan . | |
| 61-256496 | 11/1986 | Japan . | |
| 61-272868 | 12/1986 | Japan . | |
| 62-8268 | 1/1987 | Japan . | |
| 62-50958 | 3/1987 | Japan . | |
| 62-186359 | 8/1987 | Japan . | |
| 63-155359 | 6/1988 | Japan . | |

Primary Examiner—Eugene R. LaRoche
Assistant Examiner—Tan Nguyen
Attorney, Agent, or Firm—Antonelli, Terry, Stout & Kraus

[57] ABSTRACT

Disclosed is an automated teller machine including a transaction mediums processing part processing a cash card or a passbook on which information as to whether or not a user is a visually impaired person is recorded together with transaction information, a cash processing part paying and/or receiving cash, and an input part including an audio guidance part announcing audio guidance for a visually impaired person and a touch sensor part identifying a user's touch on a guidance panel thereby applying the particulars of the transaction as a transaction input, and disclosed also is an automatic cash transaction method. When a visually impaired person makes a transaction, the transaction medium processing part confirms that the user is a visually impaired person by reading that information recorded on the card or the passbook, and, in response to this confirmation, the audio guidance part in the input part announces necessary audio guidance, while the touch sensor part permits application of the transaction input by the user's touch on the guidance panel, so that the visually impaired person can easily operate the automated teller machine.

17 Claims, 10 Drawing Sheets

FIG. 5
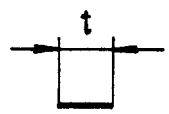
FIG. 6
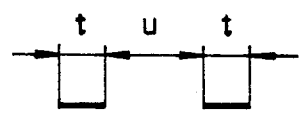
FIG. 7
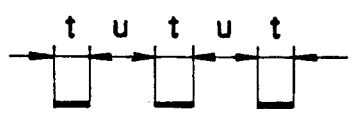
FIG. 8
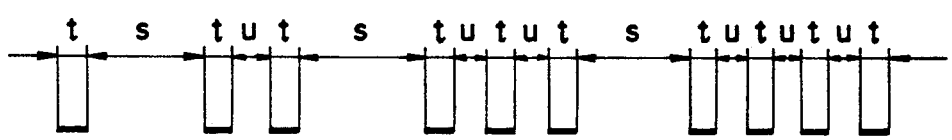
FIG. 9
— — — — — — — — —

AUTOMATED TELLER MACHINE AND METHOD THEREOF

BACKGROUND OF THE INVENTION

This invention relates to an automatic cash transaction using transaction mediums, and more particularly to a method and machine for carrying out the automatic cash transaction by applying particulars of the transaction as transaction inputs by a user touching a touch panel.

In a prior art automatic cash transaction method, required operation by a user is announced by means of audio guidance, as proposed in JP-A-55-13461. However, consideration is not taken on the occasion of operation by a visually impaired person who has no or little eyesight (referred to hereinafter as a visually impaired person).

Automated teller machines permitting easy operation by a visually impaired person are disclosed in, for example, JP-A-61-893, JP-A-61-256496 and JP-A-62-186359.

JP-A-61-893 discloses such a machine in which a visually impaired person can apply particulars of the transaction as inputs by operating keys on a handset provided on the machine. However, in the proposed machine, provision of such an additional special-purpose handset is essentially required. In the machines disclosed in JP-A-61-256496, a visually impaired person operates keys according to audio guidance announcing the classified transaction so as to select one of various operation modes classified by the kind of the transaction. However, JP-A-61-256496 does not make any novel proposal as to inputs of particulars of the transaction except the selection of the operation modes. In the machine disclosed in JP-A-62-186359, application of particulars of the transaction as inputs to a touch panel using the four corners of the touch panel is proposed. However, the user's skill is required for the application of such inputs.

Further, in the prior art disclosures, sufficient consideration is not taken on the prevention of possible pilferage of cash by another person when a visually impaired person handles the cash.

In the prior art automatic cash transaction method, the assignment of the kind of the transaction, the input of a personal identification number, the input of the amount of money, etc., are all performed by operation of keys by a user, although the required procedure for operation by the user is announced by means of audio guidance. In view of a variety of kinds of the transaction and also from the necessity for increasing the kinds of audio guidance, a method using a touch panel for operation guidance and transaction input application is increasingly employed in modern automated teller machine. However, because no consideration is taken on the transaction input means adapted to be easily operated by a visually impaired person, the prior art automated teller machine has had the problem that such a person feels much inconveniences in making required transaction using the machine.

SUMMARY OF THE INVENTION

It is an object of the present invention to provide a method and machine for an automatic cash transaction in which a visually impaired person can easily make all necessary operations including assignment of particulars of the transaction, application of his personal identification number as an input, application of a required amount of money as an input, application of a confirmation input so as to confirm whether or not the assigned particulars of the transaction are acceptable, and application of a transaction cancelling input in the course of the transaction.

Another object of the present invention is to provide an automated teller machine which can prevent pilferage of cash, a cash card or a passbook by another person during payment of the cash or during return of the card or the passbook or the depositing money when it is canceled.

Still another object of the present invention is to provide an automated teller machine which permits necessary operation even by an aged visually impaired person.

According to one aspect of the present invention which attains the above objects, there is provided an automatic cash transaction method in which a transaction medium having transaction information recorded thereon is used for the transaction, and which comprises the steps of recognizing whether or not a user is a visually impaired person by reading the transaction medium and, when the user is recognized as a visually impaired person, applying the particulars of the transaction as a transaction input by the user touching a guidance panel a predetermined number of times according to the amount of money or the kind of the transaction.

The transaction input representing the particulars of the transaction may be applied in response to speech announced by audio guidance.

According to another aspect of the present invention, there is provided an automatic cash transaction method in which transaction mediums having transaction information recorded thereon are used for the transaction and which comprises the steps of recognizing whether or not a user is a visually impaired person by reading the transaction medium and, when the user is recognized as a visually impaired person, applying the particulars of the transaction as a transaction input by the user depicting a predetermined pattern on a guidance panel according to the amount of money or the kind of the transaction.

According to still another aspect of the present invention, there is provided an automatic cash transaction method in which transaction mediums having transaction information recorded thereon are used for the transaction, and which comprises the steps of recognizing whether or not a user is a visually impaired person by reading the transaction medium, applying, when the user is recognized as a visually impaired person, the particulars of the transaction as a transaction input by the user making a predetermined operation on a guidance panel according to a speech announced by audio guidance, and, after confirmation of the completion of the operation and the user's touching on a dispensing opening, a transaction output representing the result of the transaction is dispensed from the dispensing opening.

According to yet another aspect of the present invention, there is provided an automated teller machine in which transaction mediums having transaction information recorded thereon are used for the transaction, and which comprises pattern recognition means for recognizing at least one of the number of times a guidance panel is touched by a user and a character, a symbol and a pattern depicted by the user on the guidance panel, thereby identifying application of a transaction input representing the particulars of the transaction.

According to another aspect of the present invention, there is provided an automated teller machine comprising transaction medium processing means for processing transaction mediums on which information as to whether or not a user is a visually impaired person is recorded together with transaction information, cash processing means for paying and/or receiving cash, and input means including an audio guidance part announcing audio guidance and a touch sensor part identifying a touch on a guidance panel by the user thereby applying the particulars of the transaction as a transaction input, the audio guidance part announcing the audio guidance when the transaction medium processing means confirms that the transaction medium includes the information that the user is a visually impaired person, and the touch sensor part identifying the transaction input applied by the user touching the guidance panel according to the announced audio guidance.

In lieu of the identification of application of the transaction input by the touch sensor part, the touch sensor part may identify a figure or a pattern depicted by the user on the guidance panel according to the particulars of the transaction thereby applying the transaction input.

In the automated teller machine and method thereof according to the present invention in which the audio guidance part is provided, the ordinary or routine transaction proceeds when the user is recognized as a person who is not a visually impaired person as a result of reading the transaction medium carrying the transaction information. On the other hand, when the user is recognized as a visually impaired person, the panel guidance is switched over to the audio guidance prepared for such a person. On the basis of the audio guidance, the user touches the touch panel according to a predetermined mode of touching the touch panel, thereby assigning the kind of the transaction, applying his personal identification number as an input and applying, for example, the amount of money to be deposited or paid as an input.

BRIEF DESCRIPTION OF THE DRAWINGS

These and other objects and advantages of the present invention will become apparent by reference to the following description and accompanying drawings wherein:

FIGS. 5 to 12 show various manners of applying figures or the like as a transaction input to the touch panel;

DESCRIPTION OF THE PREFERRED EMBODIMENTS

Preferred embodiments of the present invention will now be described in detail with reference to the drawings.

Figure 2:
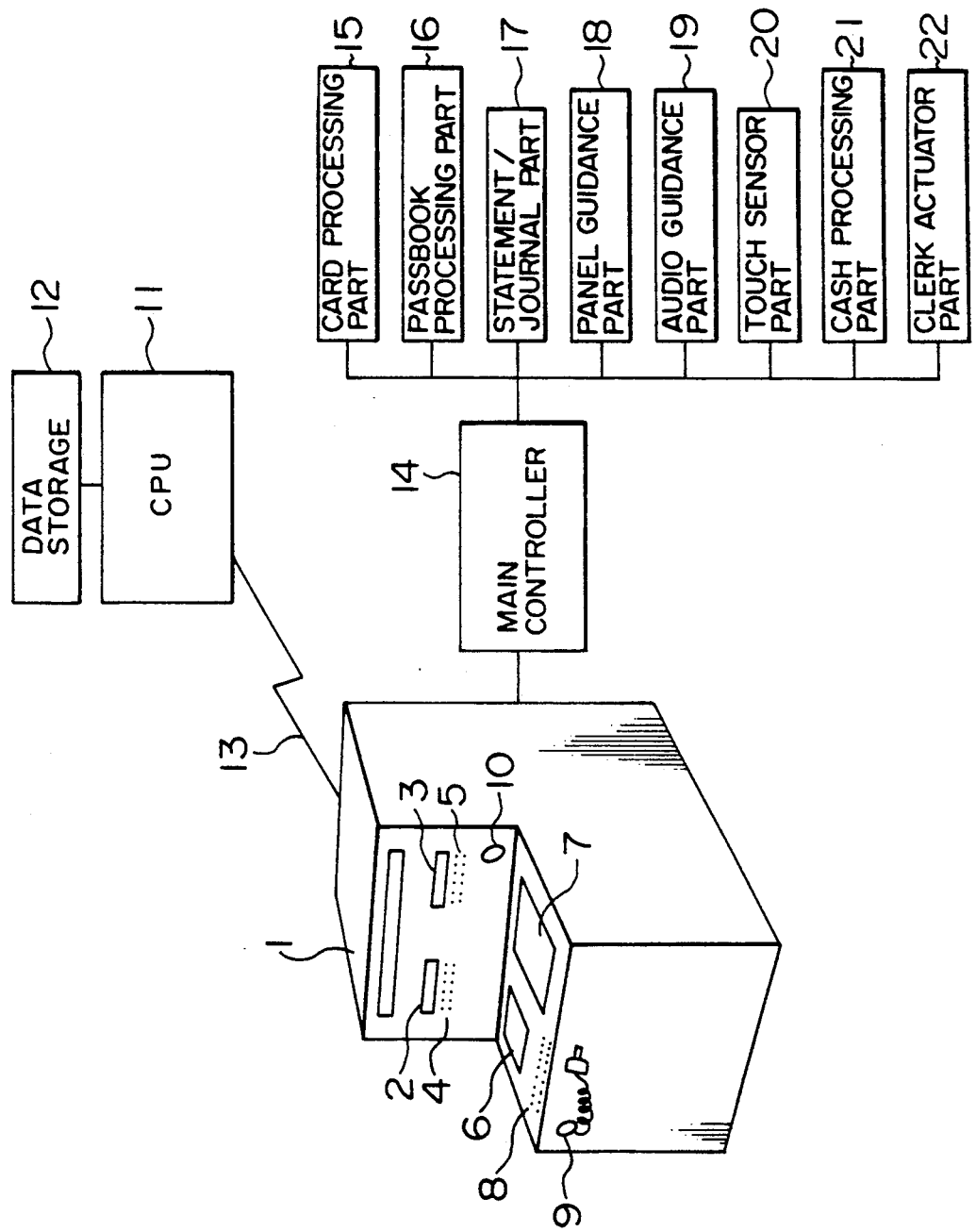
FIG. 2 is a diagrammatic view showing the structure of an embodiment of the automated teller machine according to the present invention.

FIG. 2 shows an embodiment of the automated teller machine of the present invention. Referring to FIG. 2, the machine 1 includes a passbook inlet/outlet 2, a cash card inlet/outlet 3, braille points 4 indicating the position of the passbook inlet/outlet 2, braille points 5 indicating the position of the card inlet/outlet 3, a cash inlet/outlet opening 6, a guidance panel 7, braille points 8 guiding operation of the machine 1, an earphone 9 and a loud speaker 10.

A central processor unit 11 is installed in a bank, and a data storage unit 12 connected to the CPU 11 stores information including user transaction information. The CPU 11 is connected by a communication cable 13 to the automated teller machine 1. A main controller 14 controls the operation of the automated teller machine 1. Connected to this main controller 14 are a card processing part 15 which reads and records transaction information from and on a cash card, a passbook processing part 16 which reads and records transaction information from and on a passbook, a statement slip/journal processing part 17 recording the result a transaction on a journal and issuing a statement slip to a user as required, a panel guidance part 18 issuing necessary panel guidance to the guidance panel 7, an audio guidance part 19 issuing necessary audio guidance to the earphone 9 or the loud speaker 10, a touch sensor part 20 recognizing the position or the number of times when the guidance panel 7 is touched by a user, a cash processing part 21 processing the cash handled by the machine 1, and a clerk actuator part 22 actuated by a clerk who takes care of the machine 1.

Figure 3:
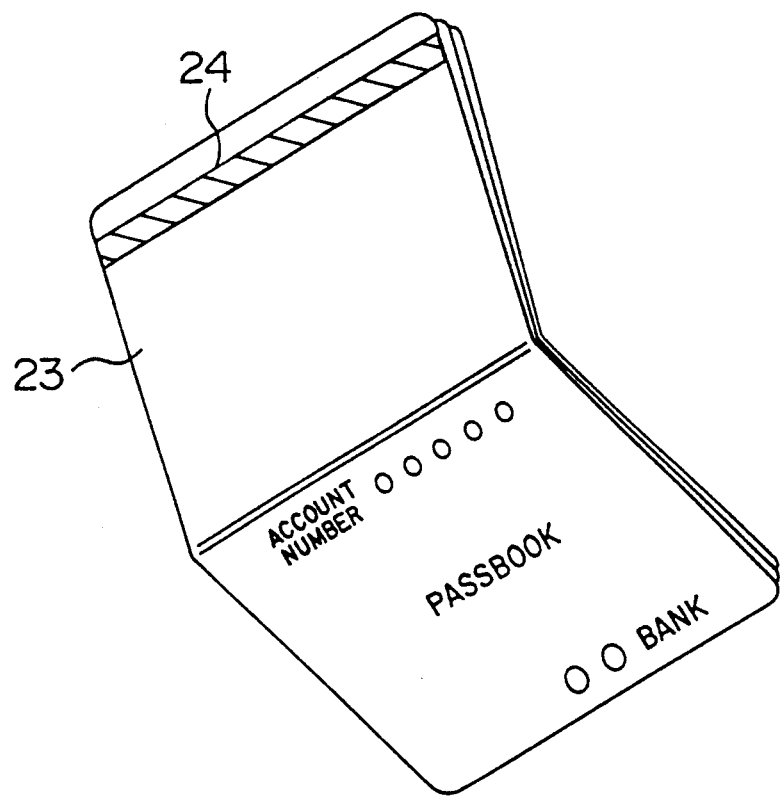
FIG. 3 shows a passbook.
Figure 4:
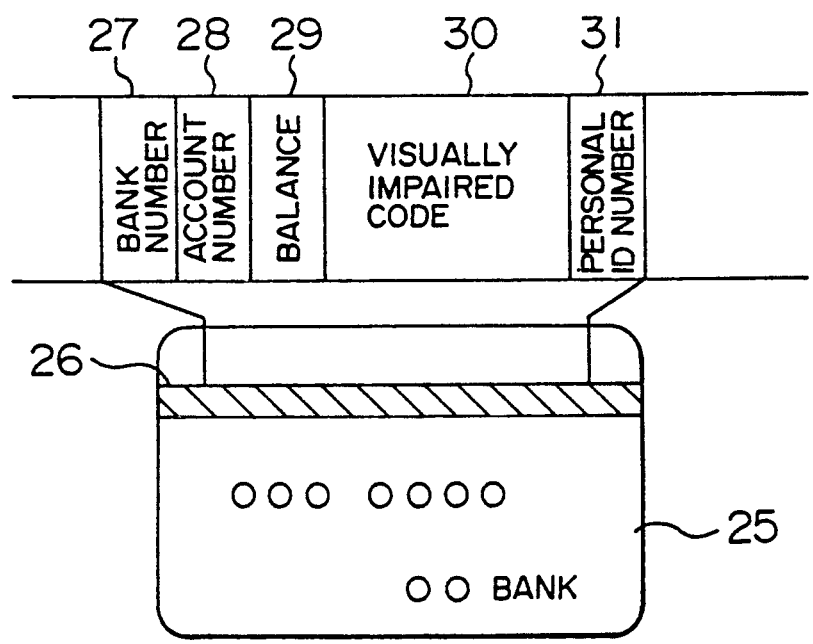
FIG. 4 shows a cash card.

FIG. 3 shows a passbook 23 issued by a bank, and FIG. 4 shows a cash card 25 issued by a bank. The passbook 23 and the cash card 25 are provided with respective magnetic stripes 24 and 26 having transaction information recorded thereon. The recorded transaction information includes a bank number 27, an account number 28, a deposit balance 29, a code 30 indicating whether the user is a visually impaired person or not, a personal identification number 31, etc.

The method of automatic cash transaction according to the present invention will now be described by referring to a flow chart of FIG. 1. First, when the cash card 25 or the passbook 23 (the transaction medium) is received by or inserted into the machine 1, the magnetic stripe (the transaction information) 26 or 24 is read, so as to identify whether the user is a visually impaired person or not. When the user is recognized as a person who is not visually impaired the transaction proceeds in the usual manner. On the other hand, when the user is recognized as a visually impaired person, the operation guidance by the guidance panel 7 is switched over to the audio guidance so that the user can make necessary operation on the basis of the audio guidance announced from the earphone 9 or from the loud speaker 10. In lieu of the provision of the earphone 9, an earphone jack may be provided so that the user can utilize his earphone or headphone to hear the audio guidance.

In the step 32, the audio guidance announces as follows: "Please touch the panel once when you want to draw out money. Please touch the panel two times when you want to deposit money. Please touch the panel three times when you want to inquire about the balance." Thus, when the user touches the guidance panel 7 the required number of times with his finger according to the audio guidance the user can assign or input the kind of the transaction.

After the audio guidance step 32, the user touches the guidance panel 7 once when he wants to draw out money. In the step 33, the following audio guidance is announced: "Please touch the panel 7 according to your personal identification number." Thus, the user inputs his personal identification number in a manner as will be described later. In the next step 34, the following audio guidance is announced: "Please touch the panel according to the number of 10,000-yen notes." Therefore, when the user wants to draw out, for example, 35,000 yen, the user touches the guidance panel 7 three times. In the next step 35, the following audio guidance is announced: "Please touch the panel according to the number of 1,000-yen notes." Therefore, the user touches the guidance panel 7 five times. In the next step 36, the following audio guidance for confirming the particulars of the transaction is announced: "35,000 yen, all right? When the amount is all right, please touch the panel once. If you want to re-try, please touch the panel two times." When the amount is all right, he touches the guidance panel 7 once. Then, after the post-processing on the card 25 or the passbook 23, the card 25 or the passbook 23 is returned to the user, and the cash is paid to complete the transaction.

When the user wants to deposit money by touching the guidance panel 7 two times after the audio guidance step 32, the following audio guidance is announced: "Please insert money into the cash inlet/outlet opening 6." In response to this audio guidance, the user inserts the money into the money inlet/outlet opening 6, and the cash processing part 21 counts the amount of money. When the count is, for example, 62,000 yen, the following audio guidance is announced in the step 37: "62,000 yen, all right? When the amount is all right, please touch the panel once. If you want the money returned, please touch the panel two times." In response to this audio guidance, the user touches the guidance panel 7 once when the amount of money is all right. Then, after the post-processing on the card 25 or the passbook 23, the card 25 or the passbook 23 is returned to the user to complete the transaction.

When, after the audio guidance step 32, the user wants to make a balance inquiry, he touches the guidance panel 7 three times to hear the following audio guidance: "The balance is (X) 10,000s yen (Y) 1,000s yen." Then, after the post-processing on the card 25 or the passbook 23, the card 25 or the passbook 23 is returned to the user together with issuance of the statement slip to complete the transaction.

Figure 17:
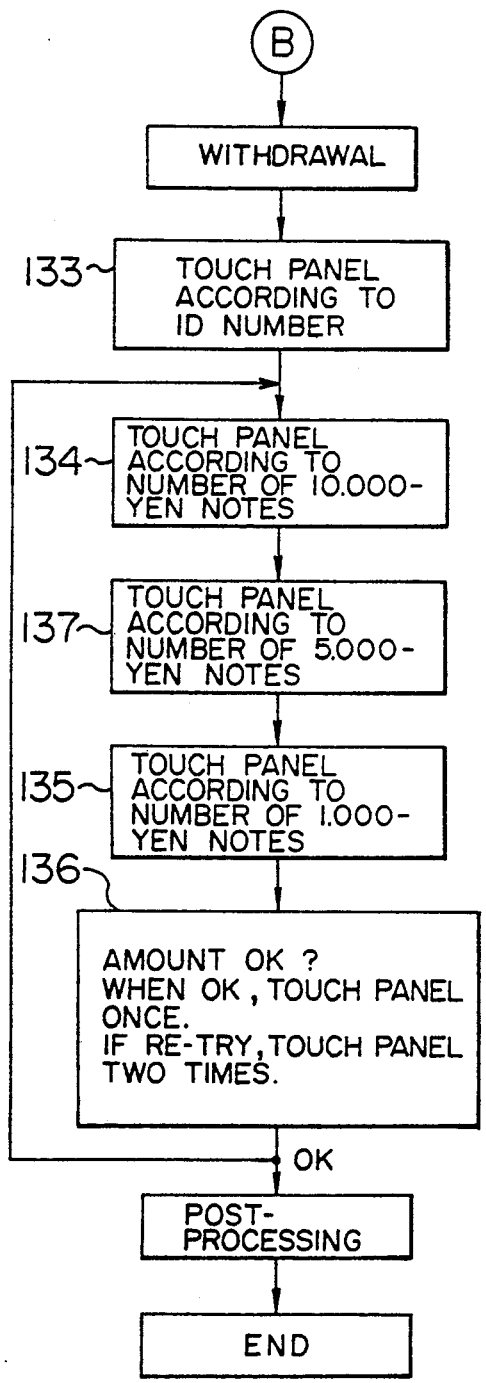
FIG. 17 is a flow chart of still another embodiment in which the amount of money are specified on the touch panel to apply a transaction input.

In the embodiment described above, the amount of money is applied as an input in the form classified by 10,000-yen notes and 1,000-yen notes which are units. However, the amount of money may be applied as an input by assigning the number of bank notes. Such an embodiment will be described by referring to a flow chart of FIG. 17 showing the case of drawing out 28,000 yen.

The user assigns the draw-out mode and applies his personal identification number as an input as in the case of the aforementioned embodiment. Suppose that the user requires payment of, for example, one 10,000-yen note, two 5,000-yen notes and eight 1,000-yen notes. In the step 134, the following audio guidance is announced: "Please touch the panel according to the desired number of 10,000-yen notes." Thus, the user touches the guidance panel 7 once. Then, the following audio guidance is announced in the step 137: "Please touch the panel according to the desired number of 5,000-yen notes." Thus, the user touches the guidance panel 7 two times. Then, the following audio guidance is announced in the step 135: "Please touch the panel according to the desired number of 1,000-yen notes." Thus, the user touches the guidance panel 7 eight times. In the step 136, the audio guidance requesting confirmation of the numbers of the bank notes is announced, and, after confirmation by the user, the assigned numbers of the bank notes are dispensed or paid.

This method of applying the input representing the desired number of bank notes to be drawn out is preferably applicable to a dispensing-purpose automated teller machine adapted for dispensing only a single kind of bank notes, for example, that dispensing 20-dollar notes only. When the user wants to draw out 60 dollars from such a machine, he can assign the desired amount of money by touching the guidance panel 7 three times.

Another embodiment, which prevents pilferage of money, a cash card or a passbook by another person at the time of output of the result of the transaction, that is, when a user receives a card, the user's passbook or receives cash withdrawn from the automated teller machine or cancels depositing transaction, will now be described by referring to a flow chart of FIG. 18. In the automated teller machine embodying this aspect, a cover openably closing the cash inlet/outlet opening 6 is provided so that, even when the cash is transferred into this opening 6, the cash cannot be received unless the cover is opened.

Figure 18:
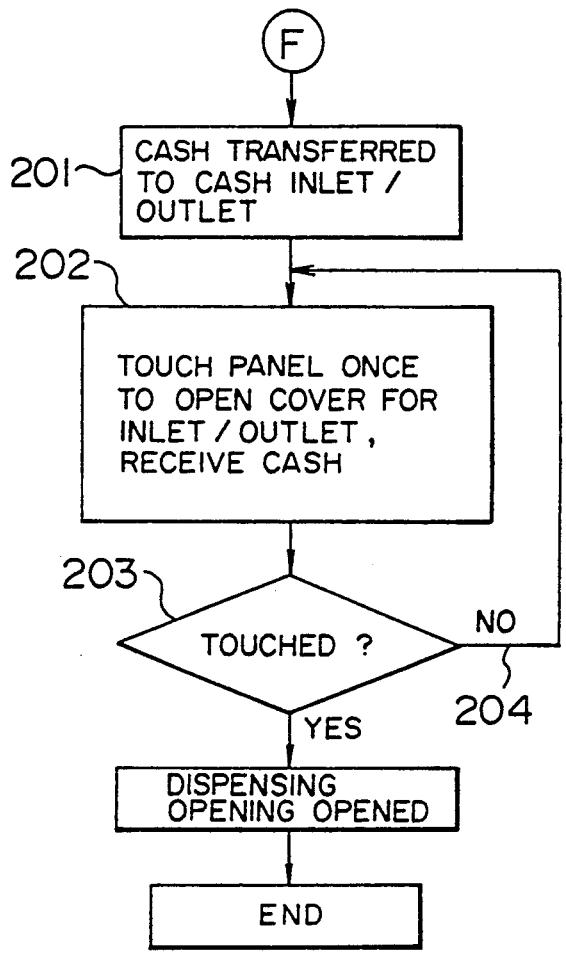
FIG. 18 is a flow chart of yet another embodiment which prevents pilferage of cash by another person.

In the step 201 in FIG. 18, the automated teller machine operating in response to the user's demand for withdrawal of cash or cancellation of a depositing transaction transfers the cash to the cash inlet/outlet opening 6 to prepare for receiving the cash. Then, in the step 202, the following audio guidance is announced: "Please touch the panel once to open the cover closing the cash inlet/outlet opening and receive the cash after the cover is opened." Thus, after the user puts his hand on the cash inlet/outlet opening 6 (the dispensing opening) to prepare for receiving the cash, he touches the guidance panel 7. After the user's touch on the guidance panel 7, the cover closing the cash dispensing opening 6 is opened, so that the user can reliably receive the transaction output which is the cash.

When the user does not touch the guidance panel 7 for the reason that, for example, he cannot understand what is announced by the audio guidance, the step 203 is followed by the step 204 so that the audio guidance is announced again.

In lieu of directly touching the guidance panel 7, it may be preferable to dispose a sensor closely adjacent to the cash inlet/outlet or dispensing opening 6 so that the cover closing the cash inlet/outlet or dispensing opening 6 is opened when the user touches the cash inlet/outlet or dispensing opening 6. In order to further ensure these operations, an arrangement may be made in which the sensor disposed closely adjacent to the cash dispensing opening 6 confirms the fact that the user's hand is put on the cash dispensing opening 6, and, after confirmation of the above fact, the user touches the guidance panel 7 so that the cover closing the cash dispensing opening 6 can be opened.

Further, pilferage of not only the dispensed cash but also the returned card or passbook can be prevented when the card or passbook is returned after confirmation of the user's touch on the guidance panel 7. Also, in lieu of the provision of the cover closing the cash inlet/outlet or dispensing opening 6, it is preferable that transfer of the cash from the cash processing part 21 is started after confirmation of the user's touch on the guidance panel 7.

FIG. 5 shows the mode of panel touching in the case where the guidance panel 7 is touched only once. The symbol t represents the period of time of panel touching. When the guidance panel 7 is thus touched only once, the period of time t is not especially limited.

FIG. 6 shows the mode of panel touching when the guidance panel 7 is touched two times. In FIG. 6, the symbol t represents the period of time of panel touching, and the symbol u represents the time intervals between the touches. When the time interval u is excessively long, the touch sensor part 20 may make erroneous recognition that the guidance panel 7 is touched only once. Therefore, it is preferable to limit the value of u to, for example, $u \leq 2$ sec.

FIG. 7 shows the mode of panel touching when the guidance panel 7 is touched three times. It is apparent that the possibility of erroneous recognition is minimized when the value of u is limited as in the case of FIG. 6.

FIG. 8 shows the mode of applying the figures of, for example, the personal identification number as an input. Suppose, for example, that the personal identification number is "1 2 3 4", in this case, the guidance panel 7 is touched in a manner as shown in FIG. 8. In FIG. 8, the symbols t, u and s represent the period of time of panel touching, the time interval between the touches, and the time interval between the figures of the personal identification number, respectively. No confusion occurs when the number of t's, that is, the number of touches is selected to be equal to the number of digits of the figures of the personal identification number. In this case too, the value of u is preferably limited as in the case of FIG. 6. The value of s need not be especially limited except for the relation $s > u$. In this case, too, the value of s is preferably limited to, for example, $u \leq 2$ sec $\leq s \leq 30$ sec so as to prevent trouble.

The values of t, u and s described above are not always operated constant, because the location where the guidance panel 7 is touched by the user is not always the same. Therefore, the touch sensor part 20 is required to have the function capable of recognizing the values of t, u and s which differ depending on the location of the guidance panel 7 touched by the user.

FIG. 9 shows how to apply a figure "0" as an input. It will be seen in FIG. 9 that the input of the figure "0" can be achieved by touching the guidance panel 7 ten times.

Figure 10:
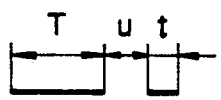
Figure 11:
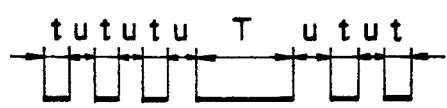
Figure 12:
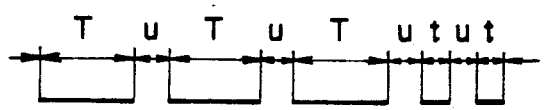

FIGS. 10, 11 and 12 show various modes which facilitate application of an input of a large number by the combination of two kinds of manners of panel touching, that is, touching for a relative long period of time and touching for a relatively short period of time. In FIGS. 10 to 11, the touch covering the relatively long period of time corresponds to a number of the tens digit larger by one digit place than that corresponding to the touch covering the relatively short period of time. In FIGS. 10 to 12, the symbol T represents the relatively long period of time of panel touching, and the symbol t represents the relatively short period of time of panel touching.

FIG. 10 shows an example of applying "11" as an input by touching the guidance panel 7 once for the period of time T and then once for the period of time t. FIG. 11 shows another example of applying "32" as an input by touching the guidance panel 7 three times for the period of time t and once for the period of time T to apply "30", and then touching the guidance panel 7 two times for the period of time t to apply "2", thereby applying "32" as the input. In lieu of the input mode shown in FIG. 11, an input model as shown in FIG. 12 may be employed. In FIG. 12, "32" is applied as the input by first applying "30" by touching the guidance panel 7 three times for the period of time T and then applying "2" by touching the guidance panel 7 two times for the period of time t.

Thus, when the user wants to draw out a large amount of money of, for example, 320,000 yen, this large number can be easily applied as an input by merely touching the guidance panel 7 in the manner shown in FIG. 11 or 12 without touching the guidance panel 7 thirty-two times.

In FIGS. 10 to 12, the values of T and t are preferably limited to, for example, $2 \sec \leq T \leq 5$ sec and $t < 2$ sec respectively, and the value of u is preferably limited as in the case of FIG. 6.

Figure 13:
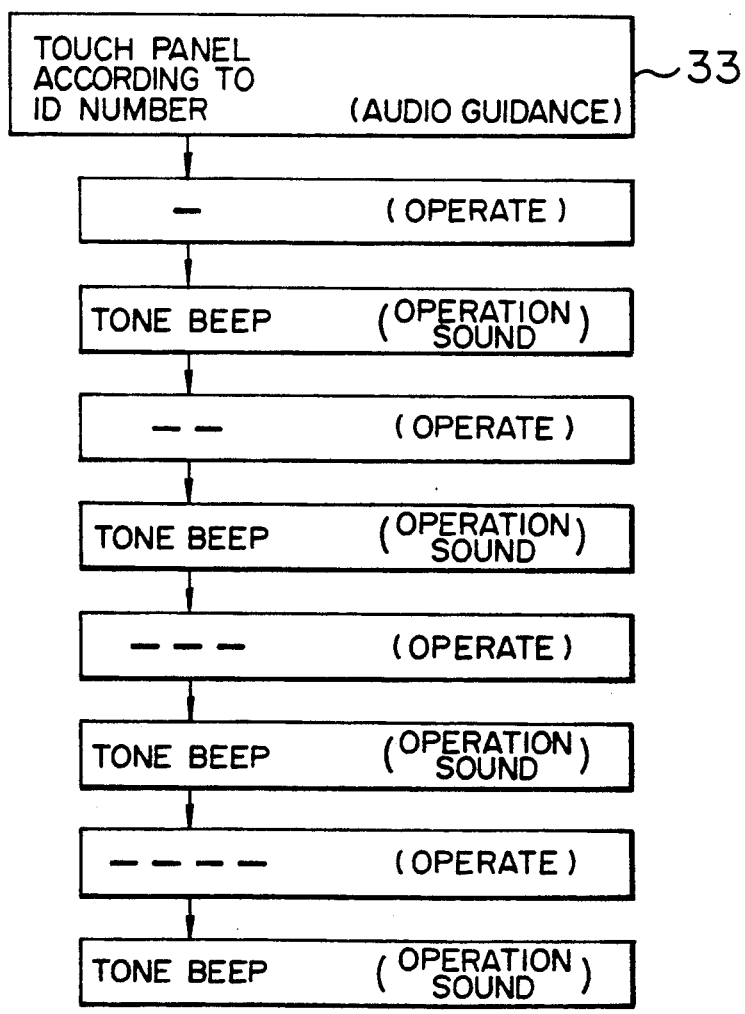
FIG. 13 shows one form of applying a personal identification number as an identification input.

FIG. 13 is a flow chart showing the sequence executed for application of, for example, the user's personal identification number as an input. In this case, in order to distinguish between the figures of the personal identification number, a sound, for example, a tone beep sound is issued by audio guidance each time one of the figures is applied by operation.

In this flow chart, it is supposed that the user's personal identification number is "1 2 3 4". In the step 33, the following audio guidance is announced: "Please touch the panel according to your personal identification number." After this guidance step 33, the user first inputs "1". In response to the end of the application of the input "1", the audio guidance issues a tone beep sound. Thereafter, this tone beep sound is issued each time the input of the individual figure is ended, so that erroneous application of the user's personal identification number can be prevented.

Figure 14:
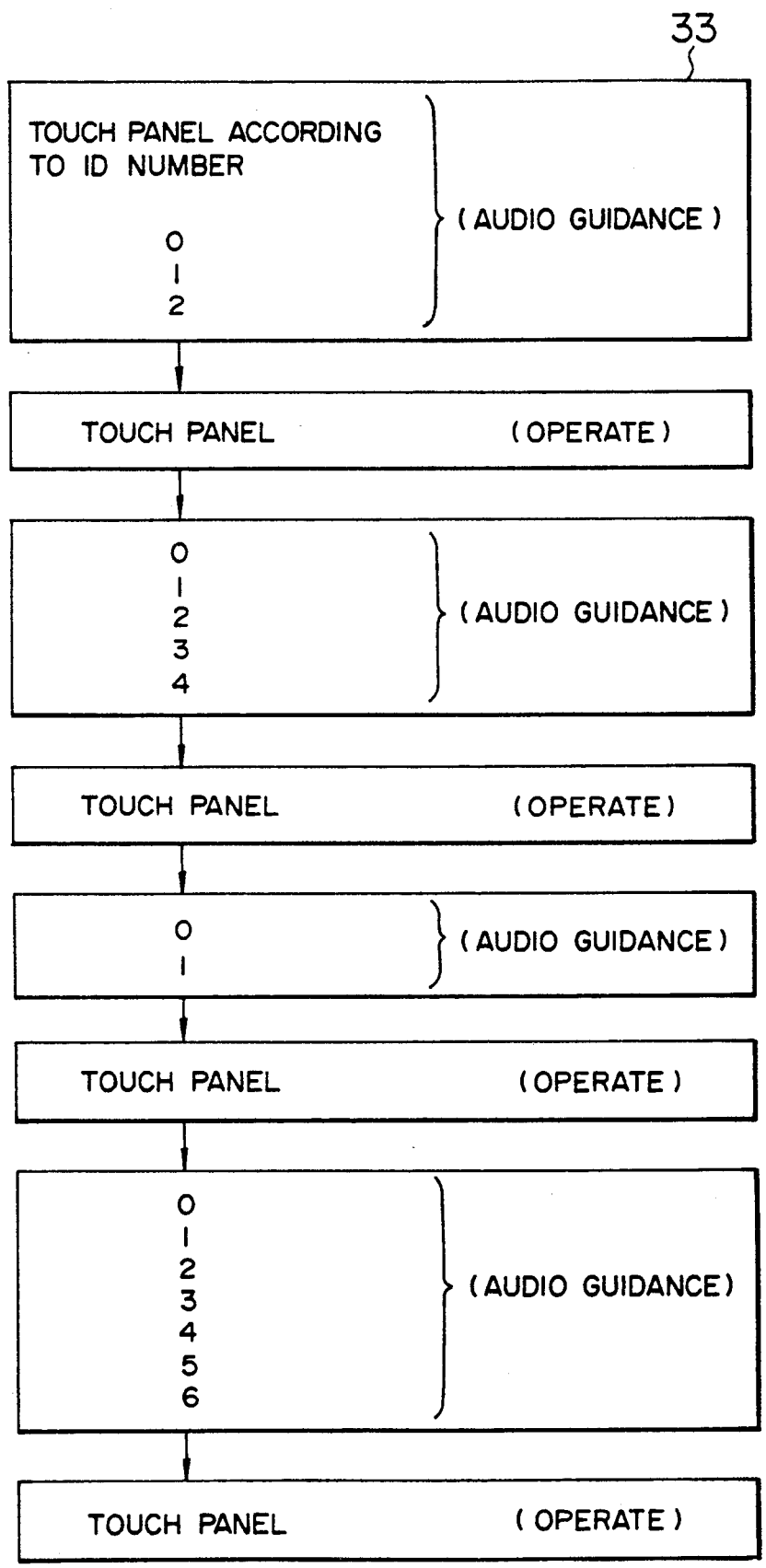
FIG. 14 shows another form of applying the personal identification number as the identification input.

FIG. 14 is a flow chart showing another means for application of, for example, the user's personal identification number as an input. It is supposed that the user's personal identification number is "2 4 1 6". In the step 33, the following audio guidance is announced: "Please touch the panel according to your personal identification number." Then, when the following audio guidance "0 1 2" is issued, the user immediately touches the guidance panel 7. Subsequently, the user touches the guidance panel 7 immediately after he hears the audio guidance "0 1 2 3 4", touches the guidance panel 7 immediately after he hears the audio guidance "0 1", and then touches the guidance panel 7 immediately after he hears the audio guidance "0 1 2 3 4 5 6". In the manner described above, the user's personal identification number "2 4 1 6" can be applied as the input.

Figure 15:
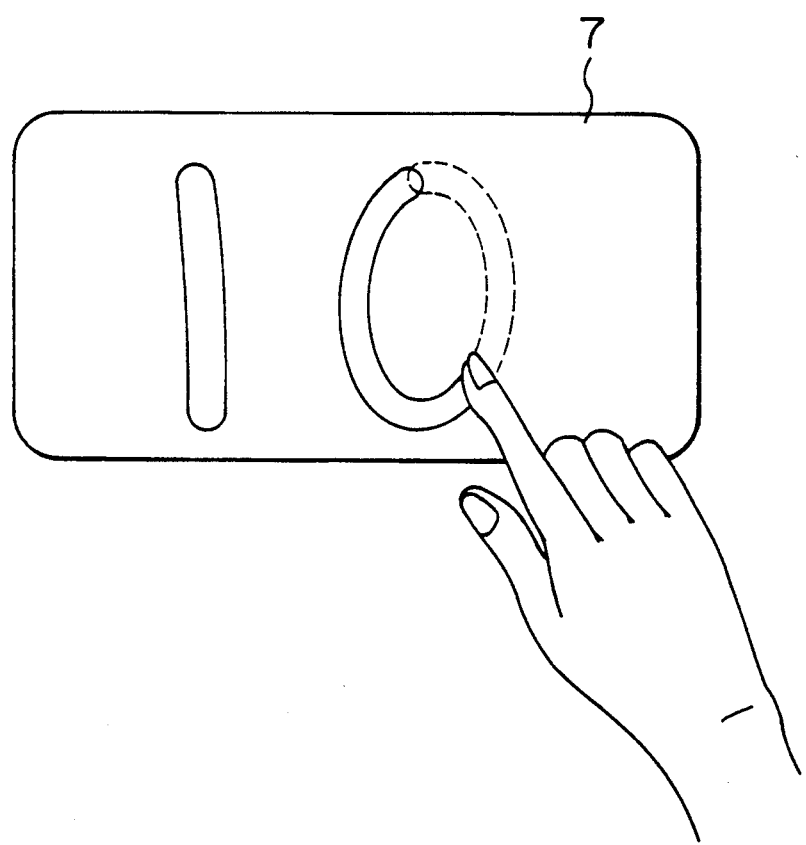
FIG. 15 shows one form of applying figures or the like as a transaction input to the touch panel.
Figure 16:
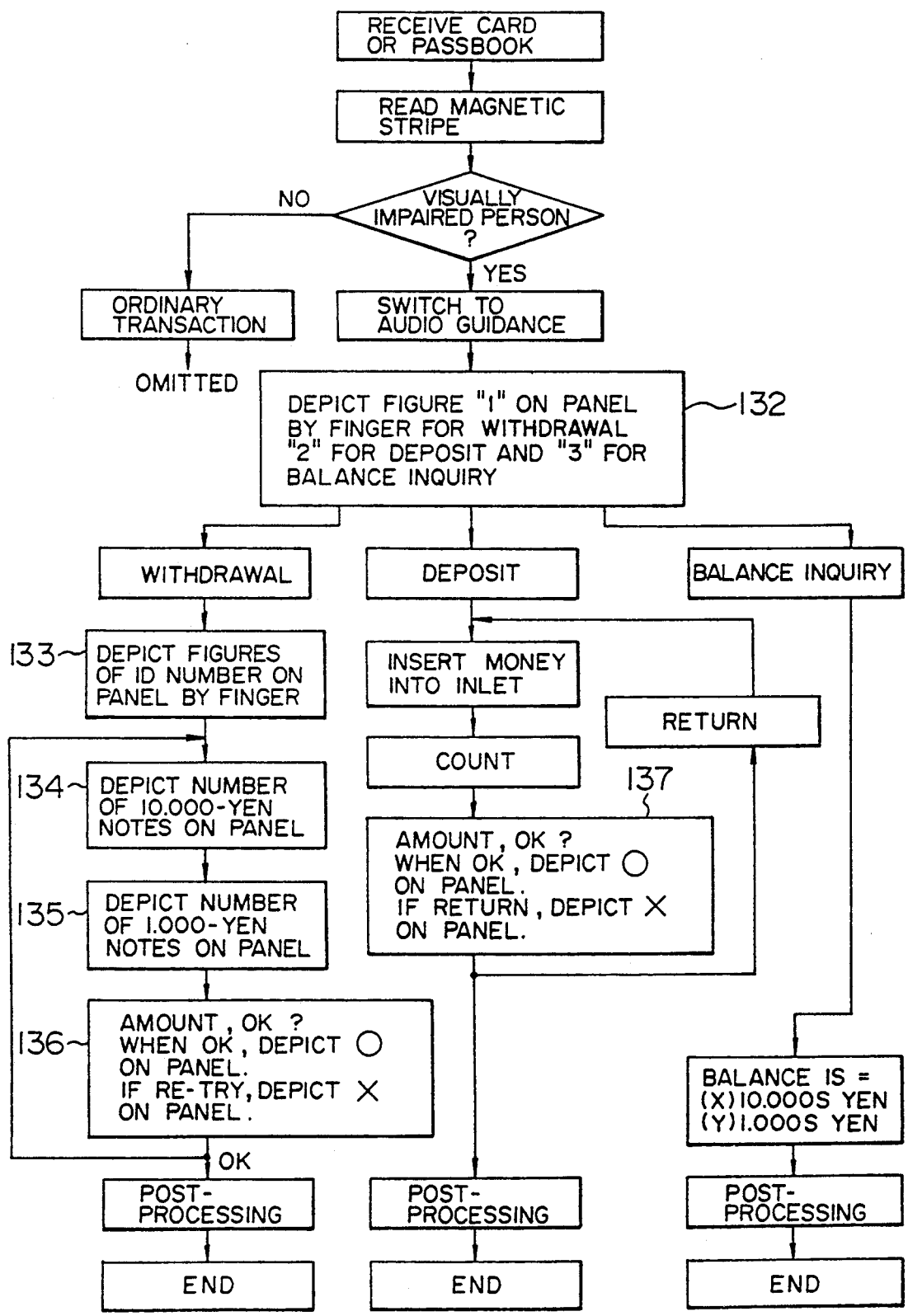
FIG. 16 is a flow chart of another embodiment in which figures are depicted on the touch panel to apply a transaction input.

FIG. 15 shows another means for applying, for example, the user's personal identification number or the amount of money as an input. When, for example, an amount of money of 100,000 yen is to be applied as an input, the user depicts "10" on the guidance panel 7 by his finger as shown in FIG. 15. This manner of input application can be attained by providing any known pattern recognition means in the touch sensor part 20. FIG. 16 is a flow chart of such an embodiment. This flow chart is generally similar to that shown in FIG. 1 but differs from the latter in that a desired figure or pattern is depicted on the guidance panel 7 in lieu of the touching.

Figure 1:
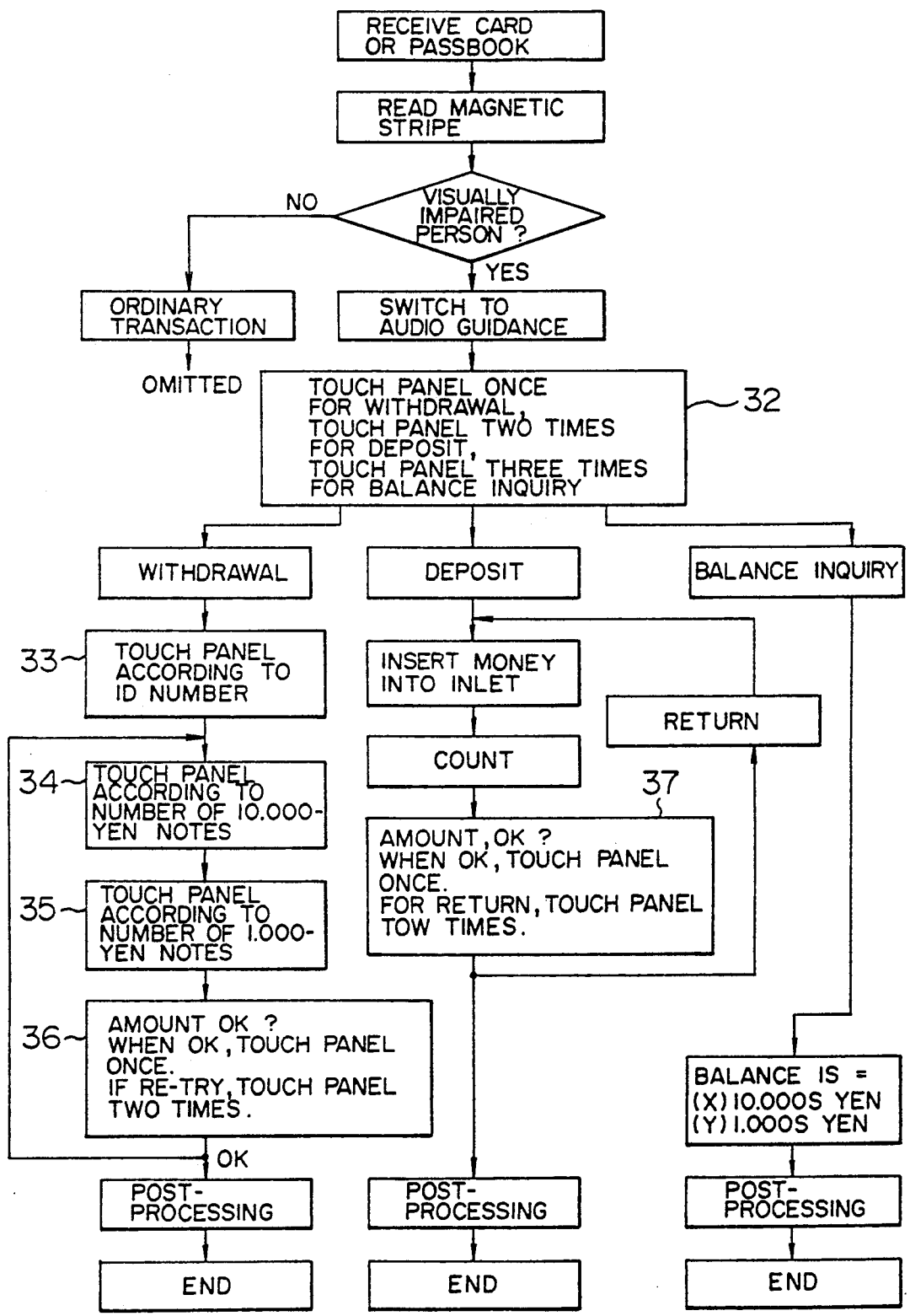
FIG. 1 is a flow chart showing an embodiment of the automatic cash transaction method according to the present invention.

Referring to FIG. 16, the step 32 in FIG. 1 is replaced by the step 132 in which the following audio guidance is announced: "Please depict, by finger on the panel, the figure "1" when withdrawal is desired, the figure "2" when depositing is desired and the figure "3" when balance inquiry is desired." Thus, the user depicts the desired figure on the guidance panel 7, and the transaction proceeds. In this case, the step 33 in FIG. 1 is replaced by the step 133 in which the following audio guidance is announced: "Please depict by finger one figure after another of your personal identification number." The step 34 in FIG. 1 is replaced by the step 134 in which the following audio guidance is announced: "Please depict the number of 10,000-yen notes on the panel." The step 35 in FIG. 1 is replaced by the step 135 in which the following audio guidance is announced: "Please depict the number of 1,000-yen notes on the panel." The step 36 in FIG. 1 is replaced by the step 136 in which the following audio guidance is announced: "The amount of money, all right? When the amount is all right, please depict ◯ on the panel. If you want to re-try, please depict × on on the panel." Also, the step 37 in FIG. 1 is replaced by the step 137 in which the following audio guidance is announced: "The amount of money, all right? When the amount is all right, please depict ◯ on the panel. If you want the money returned, please depict × on the panel." When the user wants to cancel any one of the inputs in the course of the transaction shown in FIG. 16, he depicts × on the guidance panel 7 so that the specific input can be easily cancelled.

While the present invention has been described with reference to the method of transaction using a transaction medium in the form of a magnetic memory medium such as a cash card on a passbook, it is apparent that the present invention is also applicable to the method of transaction using an optical card or an IC card.

Further, as an automated teller machine adapted to be handled by a visually impaired person, a machine having both braille points and keys in lieu of the touch panel has already been put into practical use. It is apparent that the operationability of the automated teller machine of the present invention can be improved when the touch panel used in the present invention is combined with the conventional means including the combination of the braille points and the keys.

It is also apparent that the present invention is applicable to, for example, a cash dispenser in lieu of the automated teller machine 1 shown in FIG. 2.

Still another embodiment of the present invention will now be described by referring to a flow chart shown in FIG. 19.

There is a case where the mode or method of application of inputs is desirably limited or changed. When the user is, for example, an aged visually impaired person, the period of time required for application of an input by his finger becomes generally longer than a younger person. Therefore, for the ease of operation, it is desirable to extend the time period limits for the factors t, s, u and T described already with reference to FIGS. 5 to 12. For this purpose, a personal identification code used for identification as to whether or not the user is an aged visually impaired person is additionally employed in this embodiment. This personal identification code is previously included in the user identification code 30 provided in the magnetic stripe 26 or 24 attached to the cash card 25 or the passbook 23 shown in FIGS. 4 and 3 respectively.

Figure 19:
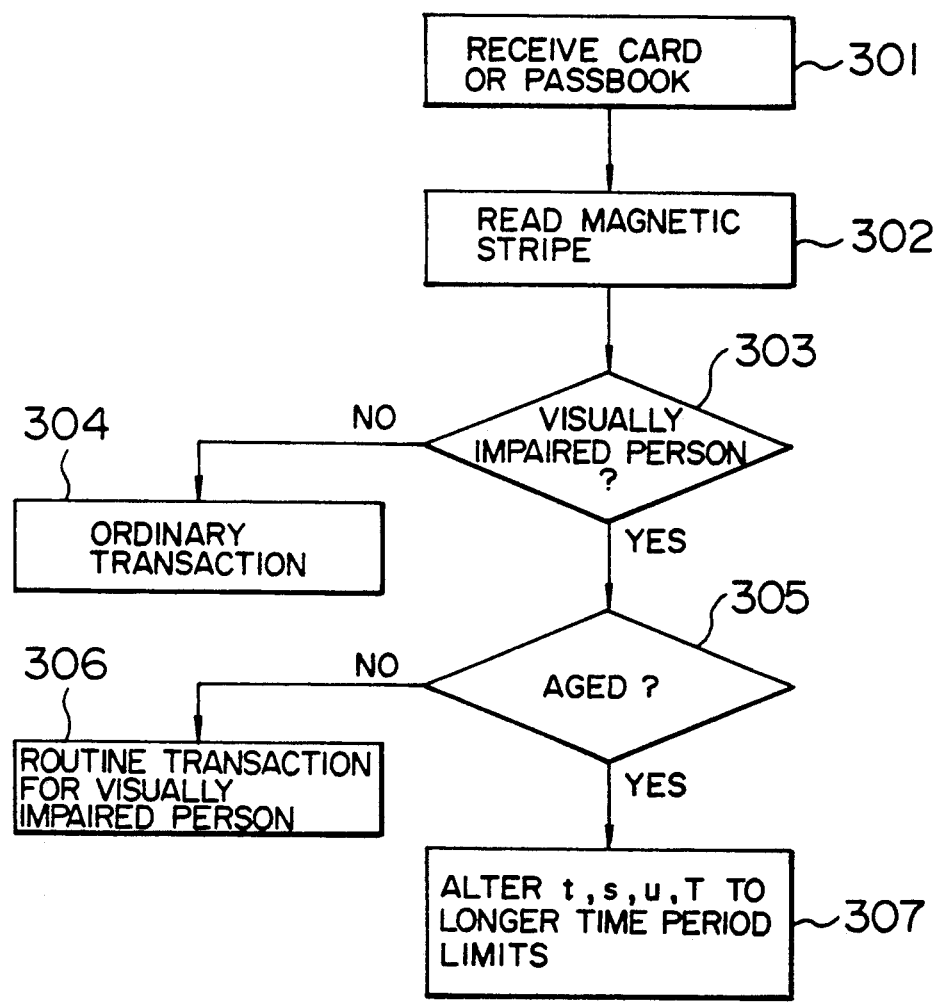
FIG. 19 is a flow chart of another embodiment in which input time period limits are switched over when the user is an aged visually impaired person.

Referring to FIG. 19, the user's cash card 25 or passbook 23 is received in the step 301, and the magnetic stripe 26 or 24 is read in the step 302. Whether or not the user is a visually impaired person is decided in the step 303. When the result of decision in the step 303 proves that the user is not a visually impaired person, the routine transaction according to the known procedure proceeds in the step 304 as in the case of the flow chart shown in FIG. 1. On the other hand, when the result of decision in the step 303 proves that the user is a visually impaired person, decision is further made in the step 305 as to whether or not the visually impaired person is aged. When the result of decision in the step 305 proves that the person is not aged, the usual manner of transaction dealing with a visually impaired person as described already is carried out in the step 306. On the other hand, when the result of decision in the step 305 proves that the visually impaired person is aged, all of the limited periods of time t, s, u and T are altered to pre-set longer periods of time in the step 307.

While the illustrated embodiment has referred to the alteration of the time period limits so as to permit operation by an aged visually impaired person, the embodiment may be modified so as to deal with other users having other physical handicaps. In this modification, a plurality of input application methods are previously prepared so as to deal with various physical handicaps of users, and one of them suitable for a specific person is selected.

According to the embodiment described with reference to FIG. 19, the limited periods of time for application of inputs to the touch panel or the manners of application of inputs of particulars of transaction are altered on the basis of the result of reading the personal identification code recorded on the transaction medium, so that even an aged visually impaired person can easily make necessary operation.

While particular embodiments of the present invention have been shown and described, it will be obvious to those skilled in the art that various changes and modifications may be made without departing from the present invention in its broader aspects.

What is claimed is:

1. An automatic cash transaction method in which transaction mediums having transaction information recorded thereon are used for the transaction, said method comprising the steps of recognizing whether or not a user is a visually impaired person by reading said transaction mediums and, when the user is recognized as a visually impaired person, applying the particulars of the transaction as a transaction input by the user touching any portion of a guidance panel a predetermined number of times according to one of the amount of money and the kind of the transaction.

2. An automatic cash transaction method according to claim 1, wherein said transaction input representing the particulars of the transaction is applied by the user in response to speech announced by audio guidance.

3. An automatic cash transaction method according to claim 2, wherein said audio guidance issues an input confirmation sound in response to the application of said transaction input by the user touching any portion of said guidance panel.

4. An automatic cash transaction method according to claim 2, wherein said audio guidance sequentially announces a series of figures, and said transaction input representing the particulars of the transaction is applied by the user touching any portion of said guidance panel as soon as the desired figure is announced.

5. An automatic cash transaction method according to claim 1, wherein said transaction input representing the particulars of the transaction is applied by the user touching any portion of said guidance panel a plurality of times corresponding to the amount of money.

6. An automatic cash transaction method according to claim 1, wherein said transaction input representing the particulars of the transaction is applied by the user touching any portion of said guidance panel a plurality of times equal to the number of bank notes to be drawn out.

7. An automatic cash transaction method in which transaction mediums having transaction information recorded thereon are used for the transaction, said method comprising the steps of recognizing whether or not a user is a visually impaired person by reading said transaction mediums and, when the user is recognized as a visually impaired person, applying the particulars of the transaction as a transaction input by the user touching a guidance panel a predetermined number of times according to one of the amount of money and the kind of the transaction;
wherein the user's touch on said guidance panel is classified into a touch for a relatively long period of time and a touch for a relatively short period of time, and said touch for the relatively long period of time is used to input a figure larger by one digit place than that provided by said touch for the relatively short period of time.

8. An automatic cash transaction method in which transaction mediums having transaction information recorded thereon are used for the transaction, said method comprising the steps of recognizing whether or not a user is a visually impaired person by reading said transaction mediums and, when the user is recognized as a visually impaired person, applying the particulars of the transaction as a transaction input by the user touching a guidance panel a predetermined number of times according to one of the amount of money and the kind of the transaction;
wherein, when the user is recognized as a visually impaired person who is aged as a result of reading said transaction medium, various limits limiting the periods of time of application of said transaction input representing the particulars of the transaction are altered to facilitate operation by said aged person.

9. An automatic cash transaction method in which transaction mediums having transaction information recorded thereon are used for the transaction, said method comprising the steps of recognizing whether or not a user is a visually impaired person by reading said transaction mediums and, when the user is recognized as a visually impaired person, applying the particulars of the transaction as a transaction input by the user depicting a predetermined pattern on any portion of a guidance panel according to one of the amount of money and the kind of the transaction.

10. An automatic cash transaction method according to claim 9, wherein said transaction input representing the particulars of the transaction is applied by the user in response to speech announced by audio guidance.

11. An automatic cash transaction method according to claim 9, wherein said transaction input representing the particulars of the transaction is applied by the user depicting a figure or figures corresponding to the amount of money on any portion of said guidance panel.

12. An automatic cash transaction method in which transaction mediums having transaction information recorded thereon are used for the transaction, said method comprising the steps of recognizing whether or not a user is a visually impaired person by reading said transaction medium, applying, when the user is recognized as a visually impaired person, the particulars of the transaction as a transaction input by the user performing a predetermined operation on a guidance panel according to speech announced by audio guidance, and, after confirmation of the completion of the operation and the user's touching of a dispensing opening, a transaction output representing the result of the transaction is dispensed from said dispensing opening.

13. An automatic cash transaction method according to claim 12, wherein said transaction output representing the results of the transaction is one of pay-out of cash and return of cash for cancelling a deposit transaction, and the cash is dispensed when a cover openably closing said dispensing opening is opened.

14. An automated teller machine in which transaction mediums having transaction information recorded thereon are used for the transaction, said machine comprising:
at least one of means for recognizing the number of times any portion of a guidance panel is touched by a user and means for recognizing at least one of a character, a symbol, and a pattern depicted by the user on any portion of the guidance panel, thereby identifying application of a transaction input representing the particulars of the transaction; and
means for performing the transaction in accordance with the transaction input.

15. An automated teller machine comprising:
transaction medium processing means for processing a transaction medium on which information as to whether or not a user is a visually impaired person is recorded together with transaction information;
cash processing means for at least one of paying and receiving cash;
input means including an audio guidance part announcing audio guidance and a touch sensor part identifying a predetermined number of touches on any portion of a guidance panel by the user for applying the particulars of the transaction as a transaction input, said audio guidance part announcing the audio guidance when said transaction medium processing means confirms that the transaction medium includes the information that the user is a visually impaired person, and said touch sensor part identifying the transaction input applied by the user touching any portion of said guidance panel according to the announced audio guidance; and
control means for controlling the cash processing means in accordance with the transaction input;

wherein said touch sensor part identifies the number of times of the user's touch on any portion of said guidance panel according to one of the amount of money and the kind of the transaction input, thereby applying the transaction input.

16. An automated teller machine according to claim 15, wherein said cash processing means includes permitting means for permitting cash pay-out to the user when the machine one of pays the cash as a withdrawal and returns the cash as cancelling a deposit transaction, and, when said transaction medium processing means confirms that the transaction medium includes the information that the user is a visually impaired person, said permitting means permits dispensing of the cash to the user, after said audio guidance part in said input means announces the audio guidance permitting the cash dispensing after the user's touch on any portion of said guidance panel, and said touch sensor part identifies the user's touch on any portion of said guidance panel according to the announced audio guidance.

17. An automated teller machine comprising:

transaction medium processing means for processing a transaction medium on which information as to whether or not a user is a visually impaired person is recorded together with transaction information;

cash processing means for at least oen of paying and receiving cash;

input means including an audio guidance part announcing audio guidance and a sensor part identifying a pattern depicted by the user on any portion of a guidance panel for applying the particulars of the transaction as a transaction input, said audio guidance part announcing the audio guidance when said transaction medium processing means confirms that the transaction medium includes the information that the user is a visually impaired person, and said sensor part identifying the pattern depicted on any portion of said guidance panel by the user according to one of the amount of money and the kind of the transaction; and control means for controlling the cash processing means in accordance with the transaction input.

* * * * *